Nov. 1, 1932.  L. BÉCHEREAU  1,885,406
MANUFACTURE OF HOLLOW BODIES
Filed June 19, 1931   9 Sheets-Sheet 2

Nov. 1, 1932.  L. BÉCHEREAU  1,885,406
MANUFACTURE OF HOLLOW BODIES
Filed June 19, 1931  9 Sheets-Sheet 9

Fig. 23

Patented Nov. 1, 1932

1,885,406

UNITED STATES PATENT OFFICE

LOUIS BÉCHEREAU, OF PARIS, FRANCE, ASSIGNOR TO SOCIETE ANONYME: AVIONS KELLNER-BECHEREAU, OF BOULOGNE-SUR-SEINE, FRANCE, A FRENCH COMPANY

MANUFACTURE OF HOLLOW BODIES

Application filed June 19, 1931, Serial No. 545,581, and in France June 20, 1930.

My invention relates to the manufacture of hollow bodies and it is chiefly applicable to the manufacture of hollow bodies having undevelopable metallic walls.

My invention makes it possible to manufacture these bodies better and more easily than it was possible up to this time. It is especially advantageous in its application to the manufacture of hollow bodies having thin walls such as hulls, wings or fuselages for aircrafts.

My invention is particularly advantageous for the manufacture of hollow bodies of that kind whose walls are formed by the assembling of a plurality of distinct panels adapted to be manufactured separately.

Up to the present time, hollow bodies of that kind were generally obtained by first building a rigid framework consisting essentially of ribs and cross members of suitable shape upon which the panels to be assembled were subsequently fixed in a permanent way.

Said framework, thus rendered integral with the hollow body had the following disadvantages among others: first to make the manufacture of hollow bodies very expensive, and on the other hand to make these bodies relatively heavy.

A first object of my invention consists in a method of manufacturing hollow bodies consisting of elements or panels made of metallic sheets suitably assembled, such as fuselages, wings, hulls, floats for aircrafts, and the like, by means of a sectional pattern or mold the outer shape of which is that of the hollow body and the outer surface of which is continuous with the exception of suitable grooves, recesses or holes which, for the sake of brevity, will hereinafter be referred to as "reserves", adapted to receive the connecting pieces of the elements or panels, such as flat bars, angle irons, rolled irons, and also pieces for locally reinforcing the structure, such as ribs, and pieces adapted to support organs of any kind whatever, such as engine, seats, electric system partitions or still pieces forming butt straps, and the like.

My invention has also for its object a particular method which consists in presenting and applying to the mold or pattern the various elements or panels, which may for instance be made of sheets of light metal, and the connecting or assembling pieces, in such manner that the latter may engage the reserves (grooves or recesses) that have been provided to this effect, and then to maintain the body, that is the whole of the elements or panels and the connecting pieces, or a part of said whole, through temporary means, such as belts, collars, screws, bolts, or the like. The patterns are then separated from said whole, either partly or wholly, either by taking the whole or a part of the pattern or mold to pieces, or by removing separately the elements made of sheet metal and the connecting elements, and finally assembling in a permanent way the elements and their connecting pieces, supporting pieces, and so on.

Another feature of my invention consists in utilizing the pattern or mold for making the shaping of the elements by applying and bending the metal sheets so that they fit exactly against the pattern or mold, cutting said elements if necessary and then adjusting said elements, and finally piercing them on the pattern or mold.

According to another feature of my invention, the reserves (grooves or recesses) of the pattern or mold are disposed in such manner that the lines along which the elements are assembled coincide but in a discontinuous manner with the generatrices of the hollow body and with the ribs of said body, that is with the sections of said body by planes at right angles to the axis of the hollow body, so as not to create parts or lines having a relatively small resistance.

Another object of my invention is to provide a hollow body having double walls or multiple walls separated by spaces of suitable volume.

My invention further comprises as new articles of manufacture, the rigid hollow bodies obtained according to my process.

The method of manufacturing hollow bodies according to my invention has the advantage to do away with the framework which makes it possible to obtain a considerable lightness of the structure and a great rapidity of assembling and manufacturing owing to the fact that several workmen can work simultaneously along the surface of the pattern or mold.

Furthermore my process allows of gang work, owing to the fact that as the metal sheets or elements and the connecting pieces have been all traced and shaped on the same pattern, they are interchangeable. Finally the work is performed very accurately because each element is given a well determined shape when the rivet holes or bolt holes are pierced therethrough, owing to the fact that, during that operation, the whole surface of said element is applied against the mold.

Preferred embodiments of my invention will be hereinafter described with reference to the accompanying drawings, given merely by way of example, and in which:

Fig. 14 is a detail view of the pattern or mold, showing a panel maintained in position against the pattern by means of belts, over the connecting pieces which are themselves temporarily secured to the pattern by means of screws.

Fig. 15 is a diagrammatic section on the line 15—15 of Fig. 14.

Fig. 16 is a detail view of a panel.

Fig. 16$^a$ is a section on the line 16$^a$—16$^a$ of Fig. 14.

Fig. 17 is an outside view of the front part of the fuselage.

Fig. 17$^a$ is a partial section on the line 17$^a$—17$^a$ of Fig. 17.

Fig. 18 is a partial section on the line 18—18 of Fig. 17.

Fig. 19$^a$ is a sectional view on the line 19$^a$—19$^a$ of Fig. 19.

Adverting to Figs. 1 to 5, which relate to the manufacture of an airplane fuselage, my method is as follows: I build a mold (Figs. 1 and 2) $a$, essentially adapted to be taken to pieces, comprising a plurality of sections $a^1$ integral with supports $a^2$, and having a volume as reduced as possible, which may be secured, through any suitable means, to a sort of core having the shape of a truncated pyramid.

Figure 1:
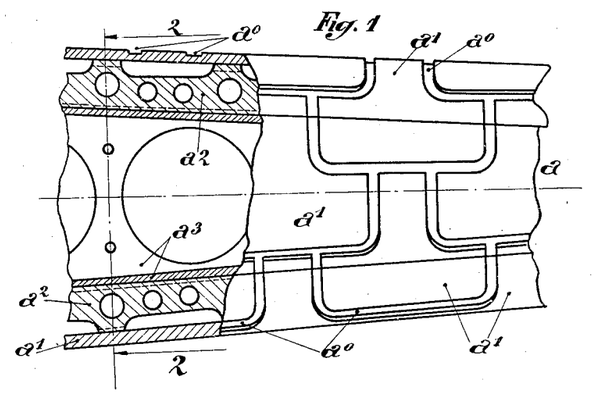
Fig. 1 is a elevational view, partly in section of a pattern or mold for an airplane fuselage.
Figure 2:
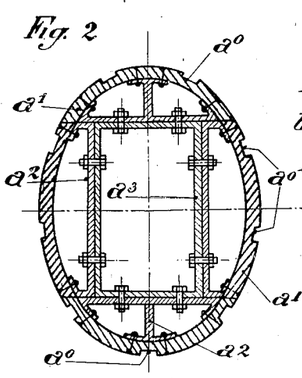
Fig. 2 is a sectional view on the line 2—2 of Fig. 1.
Figure 3:
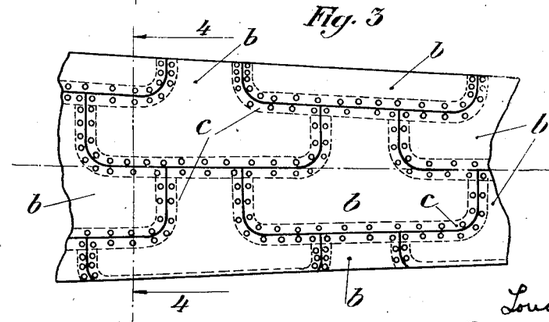
Fig. 3 shows a portion of the fuselage produced by means of the pattern or mold of Fig. 1.

Sections $a^1$ provided on their outer face with grooves, slots, or "reserves" $a^0$ having a suitable section. Said grooves have a shape that corresponds to the lines along which panels $b$ are assembled, as shown in Fig. 3.

In these grooves are disposed the connecting or reinforcing pieces $c$ for the panels (see Fig. 5) or any other pieces.

Figure 4:
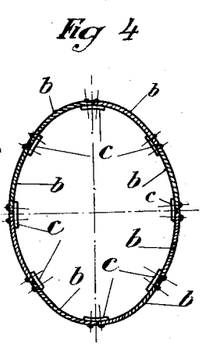
Fig. 4 is a sectional view on the line 4—4 of Fig. 3.

I prepare the machine panels $b$ and also the reinforcing or connecting pieces $c$. I place pieces $c$ in grooves $a^0$ of mold $a^1$ and then apply over said pieces $c$ panels $b$ against mold $a^1$. As above mentioned, these panels $b$ have been previously machined and the shape of each of them is determined by its position in the hollow body; of course each of said panels is disposed on the mold in its respective position. The whole is maintained through any suitable temporary means, for instance by means of belts, or preferably by means of some screws passing through panels $b$ near their edges and extending into connecting pieces $c$, as shown in Figs. 4 and 5.

Figure 5:
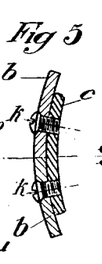
Fig. 5 is a detail sectional view of the fuselage, at an enlarged scale.

The connecting pieces $c$ consist, as shown in Fig. 5, of sectional irons such as flat irons, I-shaped, T-shaped irons, or the like, the grooves or recesses $a^0$ having a section corresponding to that of the connecting piece $c$ that it must contain.

The hollow body thus assembled is then separated from its mold. That operation will be easy to perform since as above mentioned, the mold consists of assembled elements easily taken to pieces, said pieces being successively removed either through the open ends of the hollow body, or through one or several apertures provided therein.

Panels $b$ and connecting pieces $c$ are then permanently assembled by substituting for the temporary securing means (belts, screws) permanent fixation means such as bolts and nuts, rivets and the like.

It will be readily understood from what precedes, that my invention makes it possible to obtain very easily and very quickly hollow bodies or sections of hollow bodies that do not comprise any inside framework previously established to that effect, and to give these hollow bodies or sections of hollow bodies a well determined shape independent as a whole, of the local deformations that the assembling operations may produce.

Attention is particularly called to the fact that the lines along which the elements are assembled coincide but intermittently with the generatrices and the cross-sectional lines of the hollow bodies. The strength of the latter and consequently their coefficient of safety are increased by this arrangement which avoids uninterrupted lines of lesser resistance.

Figure 6:
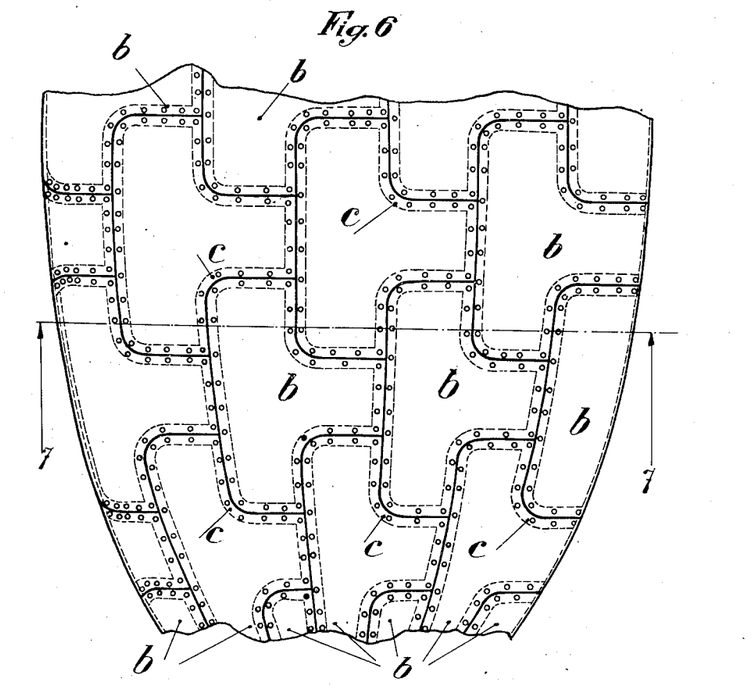
Fig. 6 is a plan view of an airplane wing.
Figure 7:
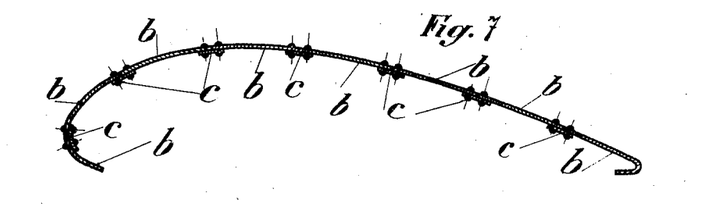
Fig. 7 is a sectional view on the line 7—7 of Fig. 6.
Figure 8:
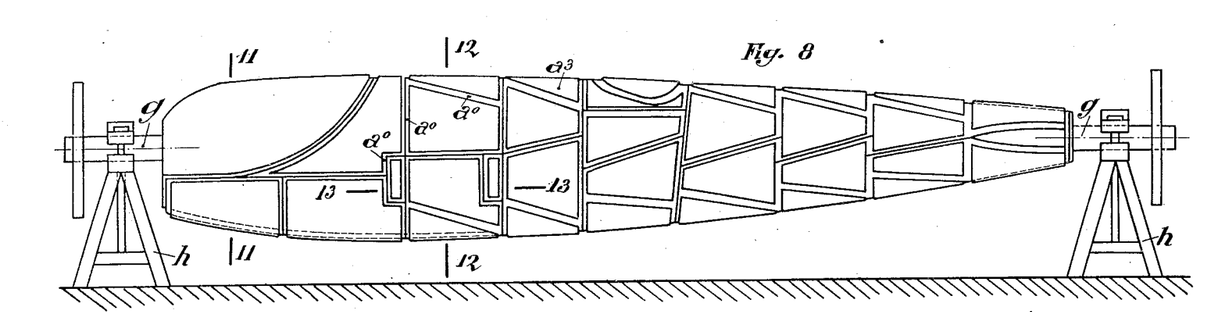
Figs. 8, 9 and 10 are a side view, a front view and a plan view respectively of a pattern or mold for an airplane fuselage fitted with the connecting pieces for holding together the panels.
Figure 9:
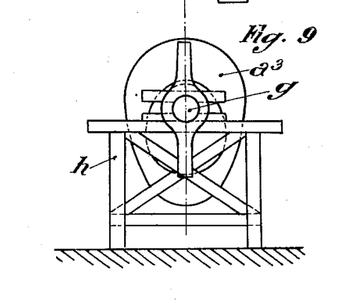
Figure 10:
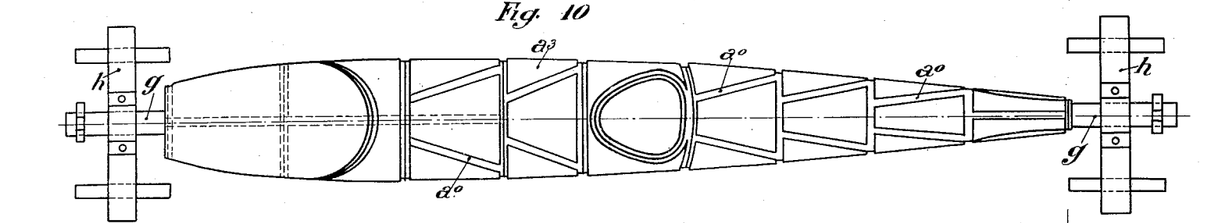

Of course my invention is not limited to the particular method above described. It may very advantageously be applied, as shown in Figs. 6 and 7, to the manufacture of main supporting surfaces for airplanes (or seaplanes) in which the elements are subjected to very high stresses.

Figures 11, 12, 19:
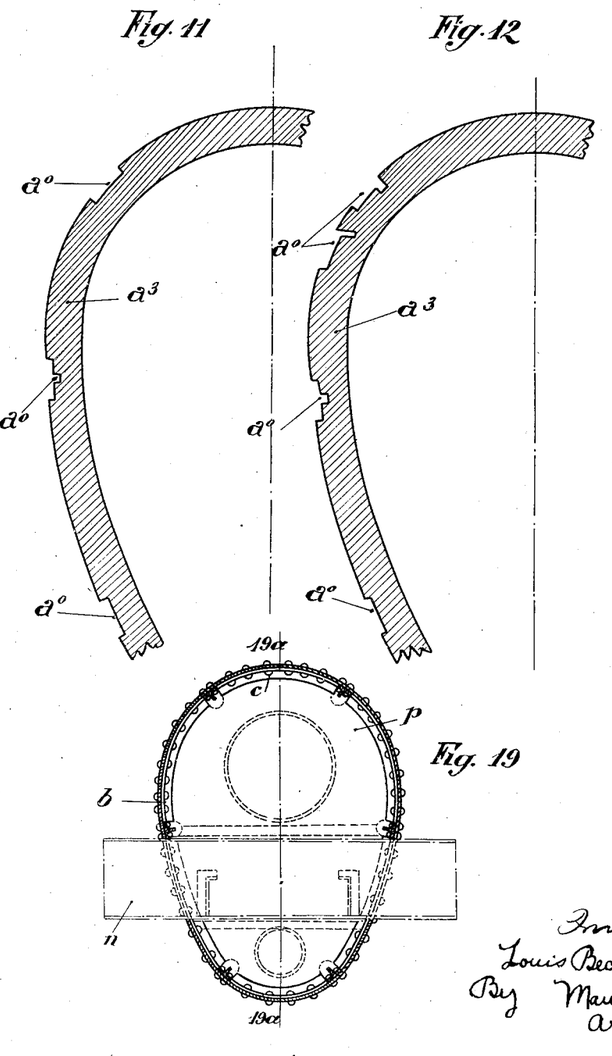
Figs. 11, 12 and 13 are sectional views on the lines 11—11, 12—12 and 13—13 respectively of Fig. 8.
Fig. 19 is a sectional view on the line 19—19 of Fig. 17.
Figure 13:
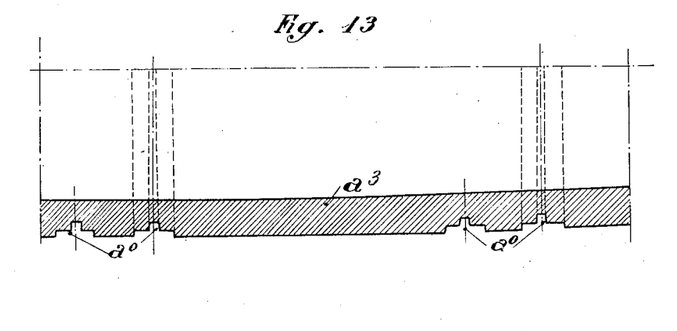

In the particular method illustrated in Figs. 8 to 19, the pattern or mold $a^3$, which is made of wood or any other suitable material, and consists of one or several parts which may be adapted, to be taken to pieces or not, is mounted on bearings $g$ supported by trestles or other supports $h$, which makes it possible to rotate the pattern about itself according to the needs for fixing the panels and connecting pieces. As in the preceding example, said pattern is provided on its surface with grooves or reserves $a^0$ the shape and the section of which is adapted to correspond to the shape of the connecting pieces through which the panels that form the hollow body and the reinforcements of said panels are assembled. Figs. 11, 12 and 13 show the sections of some of these grooves or reserves, the shapes of these sections being different according as the piece that is to be inserted in the groove is a flat iron, or an I-shaped or T-shaped iron or the like.

Figures 14, 15, 16, 16A:
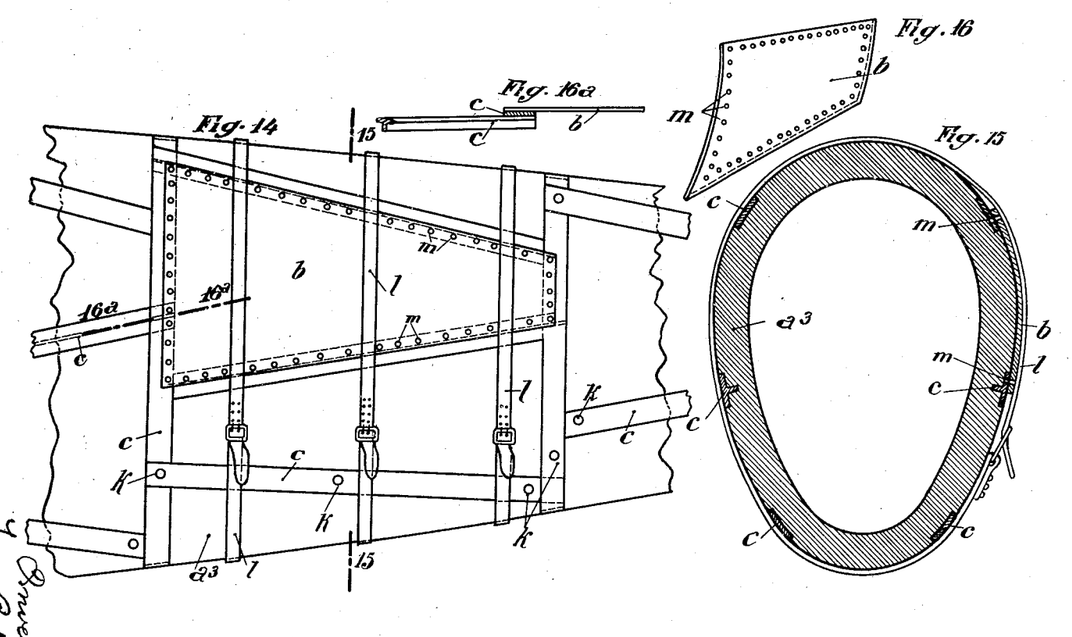

Said sectional irons $c$ are cut, bent, curved in such manner that they may be inserted in reserves $a^0$ provided to that effect in the mold, care being taken as far as possible as shown in Fig. 14, to imbricate said flat straps or sectional irons, that is to say to dispose them in such manner that they cross one another and are alternately superimposed.

Sectional irons $c$ are adjusted in the grooves of mold $a^3$, said irons playing the parts of connecting pieces or of butt straps for panels $b$, and they are fixed in said grooves so as to be flush with the surface of the mold.

They are kept in position by means of screws $k$ (Fig. 14), for instance one screw at either end of sectional iron $c$.

Afterwards, if a sufficient machinery is available panels $b$ (made for instance of a sheet of light alloy) are manufactured separately so as to give them their final shape or, if that is not the case, they are shaped on the pattern and cut thereon.

Each panel $b$ is then applied in position and it is maintained in said position by means of belts or straps $l$ so as to prevent any possibility of the panel sliding out of position.

All the superimposed elements are then marked and afterward pierced through (these elements comprising the panel $b$, and the connecting or reinforcing pieces $c$) so as to provide holes $m$ though which may pass rivets, screws, bolts or other pieces serving to secure the panels to the connecting or reinforcing pieces $c$. Panel $b$ is then removed. The same operation is repeated for all the panels of the same section or annular element, and when all the panels and their connecting or reinforcing elements have been pierced, the connecting pieces or butt straps are unfastened and removed from the mold. Said pieces $c$ are then fixed, as soon as they are removed from the mold, to their respective panels $b$ so as to assemble together the panels of a same annular section.

Figures 17, 17A, 18, 19A:
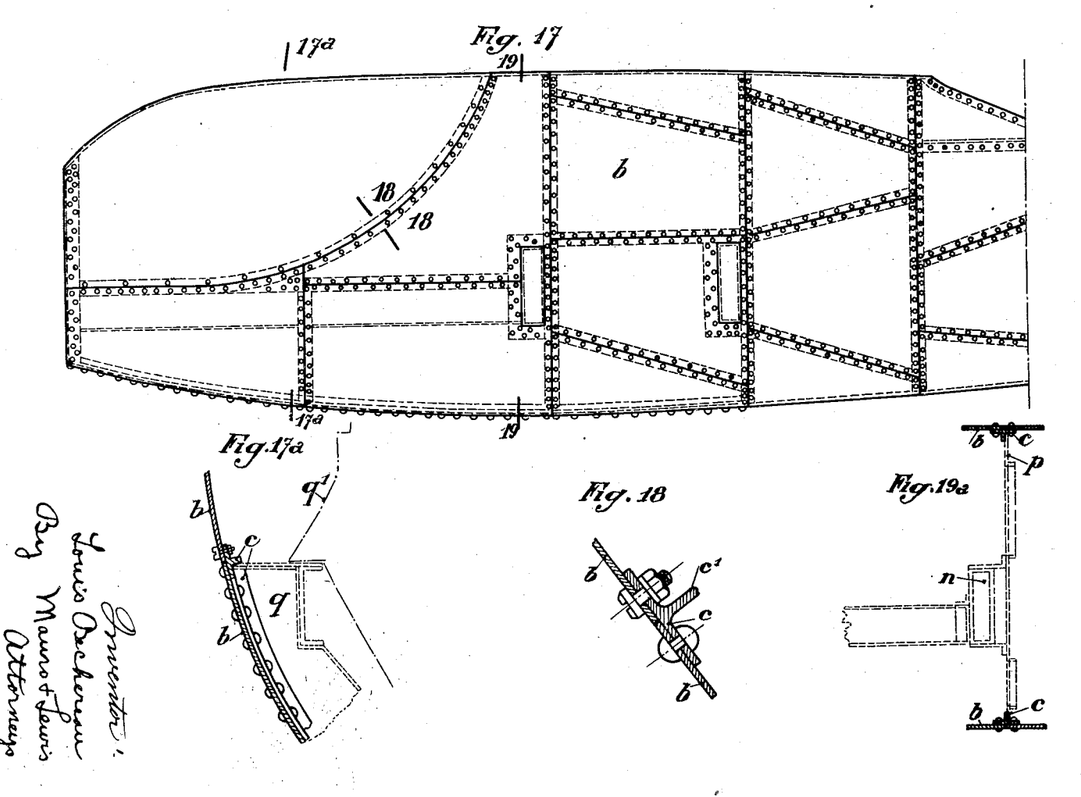

The different annular sections of the fuselage or hollow body being thus formed, they are assembled to each other, and as each element (panel $b$ or piece $c$) is disposed with respect to the adjacent elements in the relative position that it occupied on the mold, the desired hollow body is obtained, the front part of said body being shown in Figs. 17 and 19, in elevation and in cross section respectively.

It will be seen in Fig. 18 that connecting piece $c$ is a T-shaped sectional iron the web $c^1$ of which projects from the inner wall of fuselage $b$. Said projecting part $c^1$ may be utilized for supporting or maintaining any organ whatever which may be intended for the equipment.

Figs. 19 and 19$^a$ show how the connecting pieces $c$ may be used for the fixation of a partition $p$ inside the fuselage or hollow body $b$ and how the wing longitudinals $n$ can be secured to the hollow body.

Adverting to Fig. 17$^a$, it will be seen that the connecting pieces $c$ serving to the fixation of the support $q$ of the engine $q^1$, which support also plays the part of a strut or reinforcing partition inside fuselage $b$. It will also be possible to utilize the different elements (such as partition and floorings) that must be provided for the cockpit or cabin for the internal reinforcing of fuselage $b$.

Figures 20, 21:
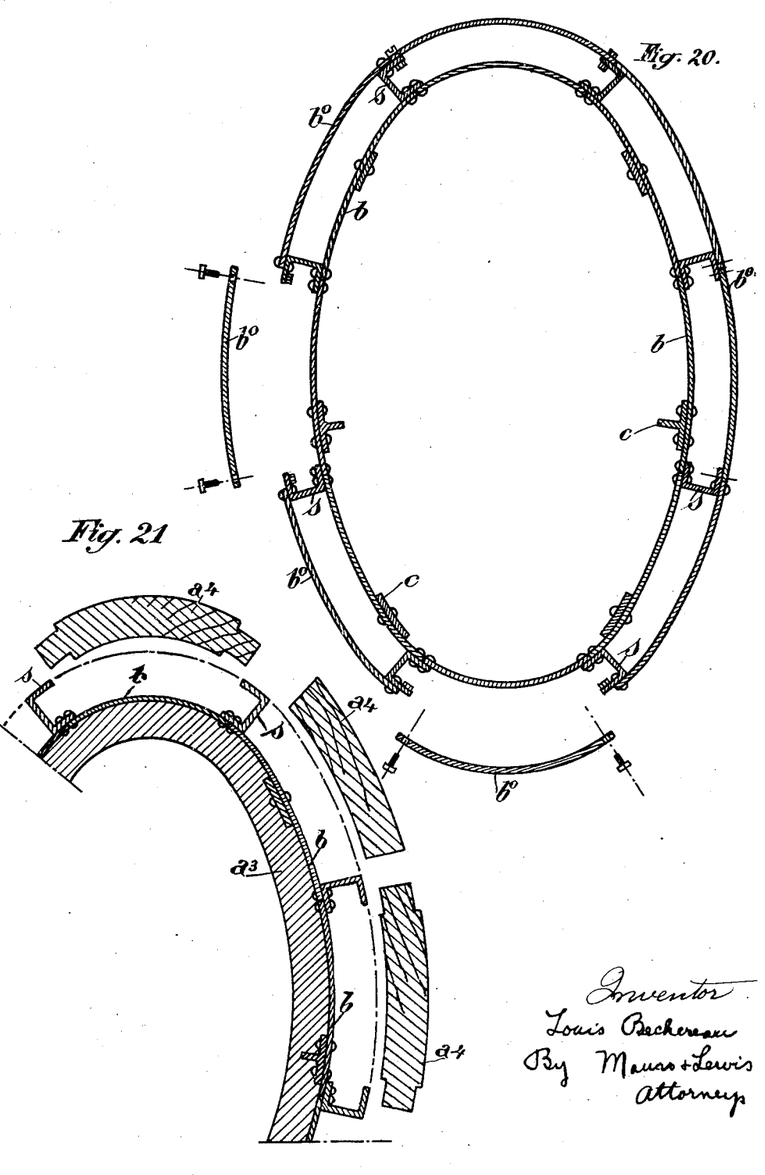
Fig. 20 is a cross section of an airplane fuselage having double walls.
Fig. 21 illustrates the mode of manufacturing said fuselage.

In the preceding examples, the hollow body or fuselage consists of a single wall. It is possible, according to my method to manufacture a hollow body having multiple walls for instance double walls, as shown in Fig. 20. The inner wall $b$ of the fuselage is formed as above described by means of the pattern or mold $a^3$ (Fig. 21); a second mold or pattern, suitably made of a plurality of sections $a^4$, is then placed on the inner wall $b$ of the fuselage and is maintained thereon through any suitable means. Said sections are of course disposed in such manner as to leave between them the necessary space for the elements or sectional irons $s$ that act as braces between the inner wall $b$ of the fuselage and the outer wall $b^0$. Said outer wall $b^0$ is also manufactured as above described, with that difference that the connecting and reinforcing pieces consist of the sectional irons $s$ (Fig. 20), which may, for instance, be U-shaped.

If it is desired to produce a hollow body comprising, at one point of its surface, a fluidtight chamber, the method just described for the manufacture of a fuselage having a double wall will be made use of for the formation of a fluid-tight chamber at that point.

It is possible, in particular, to utilize said hull having double walls as a heat interchanger or radiator for the engine of the airplane, by means of suitable partitions producing a circulation of the liquid between the two walls. It is also possible to produce a float or a wing having double walls and to provide for the circulation of a liquid between said walls.

Figure 22:
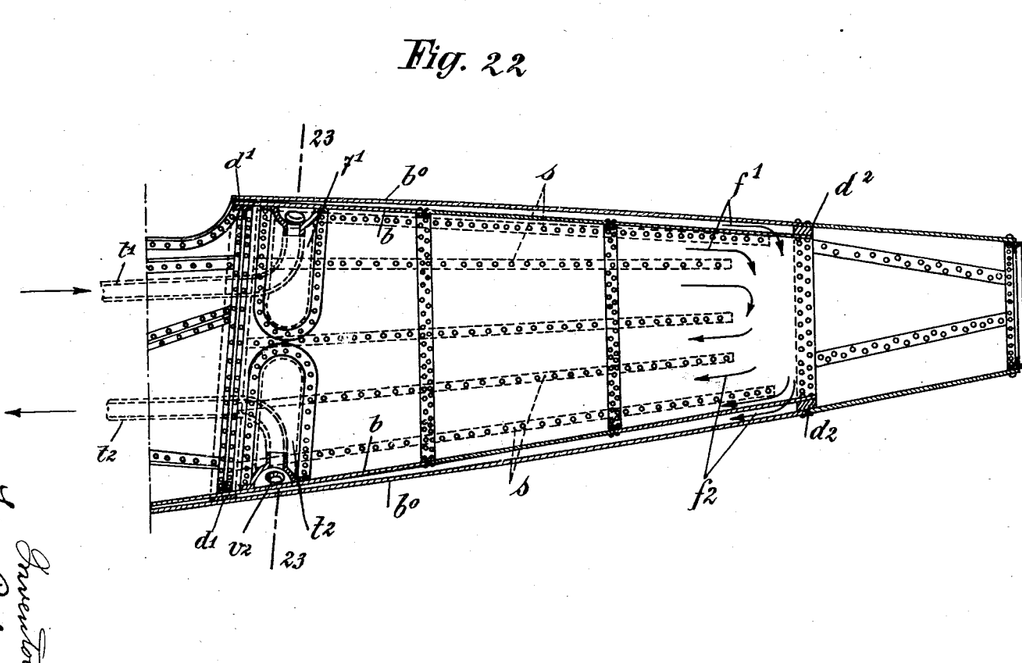
Fig. 22 is a longitudinal section of an airplane fuselage having a double wall forming a radiator.
Figure 23:
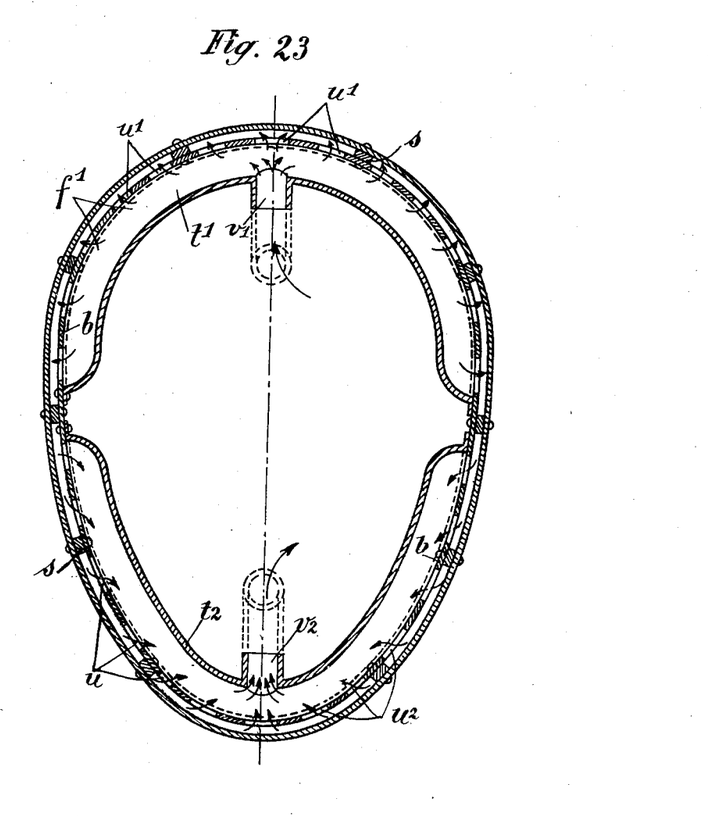
Fig. 23 is a cross section on the line 23—23 of Fig. 22.

Figs. 22 and 23 show an embodiment of a hull having double walls and acting as a radiator, said hull being built according to the above described process.

The annular space between walls $b$ and $b^0$ is closed at the forward end by packing $d^1$ and at the rear end by packing $d^2$ so as to form a fluidtight chamber in which the liquid flows in the direction of the arrows between the longitudinal partitions $s$ forming struts. The headers $t^1$ $t^2$ (Fig. 23) are located at the front end and communicate respectively with the upper and the lower part of the fluidtight chamber through openings $u^1$, $u^2$ provided in the inner wall $b$. The liquid is admitted at $v^1$ into header $t^1$, flows through the upper part of the chamber (arrows $f^1$) and comes (arrow $f^2$) into header $t^2$ and issues therefrom at $v^2$.

It should be well understood that it is not necessary, according to my invention, that the various elements that form the hollow body connecting elements, reinforcing elements, equipment elements should be wholly distinct from one another. On the contrary, for the sake of simplicity and lightness, a single element might perform multiple functions.

To this effect, it will be advantageous to have the lines along which the elements that form the wall are assembled coincide with the lines along which the reinforcements are disposed and with the lines of the partition supports.

In that manner my invention will be more efficient because the hollow bodies thus obtained will be, for the same strength, lighter and more homogeneous, the more as the thickness of the panels and the sections of the connecting and reinforcing elements will both be chosen in inverse ratio to the curvature of the wall at the corresponding point, account being taken of the stresses to be withstood.

My invention is of course not limited to the examples or to the embodiments that have been specifically described, but comprehends all possible embodiments that come within the scope of the appended claims.

What I claim is:

1. A method of manufacturing hollow bodies and especially bodies having undevelopable metallic walls which comprises applying a plurality of panels on a mold having the desired shape, temporarily assembling said panels, providing registering holes throughout said panels, separating said panels from said mold, and permanently assembling said panels through fixation means extending through said holes.

2. A method of manufacturing hollow bodies and especially bodies having undevelopable metallic walls which comprises placing connecting pieces on a mold having the desired shape, applying a plurality of panels on said mold over said connecting pieces, temporarily assembling the whole, providing registering holes throughout said panels and said connecting pieces, separating said panels and said connecting pieces from said mold and permanently assembling said panels and said connecting pieces together through fixation means extending through said holes.

3. A method of manufacturing hollow bodies and especially hollow bodies having undevelopable metallic walls which comprises placing connecting pieces on a mold having the desired shape, and consisting of a plurality of sections adapted to be separated from one another, applying a plurality of panels on said mold over said connecting pieces, temporarily assembling the whole, providing registering holes throughout said panels and said connecting pieces, removing separately the sections of the mold, and permanently assembling said panels and said connecting pieces through fixation means extending through said holes.

4. A method of manufacturing hollow bodies and especially bodies having undevelopable metallic walls which comprises placing connecting pieces on a mold made of a single unit, applying a plurality of panels on said mold over said connecting pieces, temporarily assembling the whole, providing registering holes throughout said panels and said connecting pieces, separately removing said panels and said connecting pieces from said mold, and permanently assembling said panels and said connecting pieces through fixation means extending through said holes.

5. A mold for the manufacture of hollow metallic bodies and especially of bodies having undevelopable walls which comprises a plurality of sections adapted to be readily taken to pieces, the surfaces of the assembled mold being provided with grooves having a shape corresponding to that of sectional irons, so that sectional irons may be placed in said grooves without projecting from the surface of the mold.

6. A mold for the manufacture of hollow bodies and especially of metallic bodies having undevelopable walls which comprises a single unit having the shape that it is desired to give to the inner wall of the hollow body, the outer surface of said unit being continuous and provided with grooves having a shape corresponding to that of sectional irons, so that sectional irons may be placed in said grooves without projecting from the surface of the mold, and trunnions integral with said mold disposed along the longitudinal axis thereof, whereby said mold can be rotated in order to facilitate the work.

7. A method of manufacturing hollow bodies and especially bodies having undevelopable metallic walls, which comprises providing a mold with a plurality of grooves having a shape corresponding to that of sectional irons, placing sectional irons in said grooves, temporarily fixing them therein so that they do not project from the surface of the mold, manufacturing a plurality of panels of a light metal having a shape corresponding to that of said mold, applying said panels on said mold over said connecting pieces formed by the sectional irons, temporarily assembling the whole, providing registering holes in said panels and said sectional irons, separating said panels and said sectional irons from said mold, and permanently assembling said panels and said sectional irons through fixation means extending through said registering holes.

8. A method of manufacturing hollow bodies and especially metallic bodies having undevelopable walls which comprises providing a mold with a plurality of grooves having a shape corresponding to that of sectional irons, placing sectional irons in said grooves so that they do not project from the surface of the mold, applying a plurality of sheets of a light metal on said mold, shaping and cutting said sheets thereon so as to form a plurality of adjoining panels conforming in shape to the mold, providing registering holes throughout said panels and said sectional irons, separating said panels and said sectional irons from said mold, and permanently assembling said panels and said sectional irons through fixation means extending through said registering holes.

9. A method of manufacturing hollow bodies and especially metallic bodies having undevelopable walls, which comprises providing a mold made of a plurality of sections readily detachable from one another with a plurality of grooves having a shape corresponding to that of sectional irons, placing sectional irons in said grooves, temporarily fixing them therein so that they do not project from the surface of the mold, applying a plurality of panels of a light metal having a shape corresponding to that of the mold on said mold over said sectional irons, temporarily assembling the whole, providing registering holes through said panels and said sectional irons, successively removing the sections of the mold from the inside of said assembled panels, and permanently assembling said panels and said sectional irons through fixation means extending through said registering holes.

10. A method of manufacturing hollow bodies and especially metallic bodies having undevelopable walls, which comprises providing a mold made of a single unit with a plurality of grooves having a shape corresponding to that of sectional irons, placing sectional irons in said grooves, temporarily fixing them therein so that they do not project from the surface of the mold, applying a plurality of panels of a light metal having a shape corresponding to that of the mold on said mold over said sectional irons, temporarily assembling the whole, providing registering holes through said panels and said sectional irons, successively removing the panels and the sectional irons from the surface of the mold, and permanently assembling said panels and sectional irons through fixation means extending through said registering means.

11. A method of manufacturing hollow bodies and especially metallic bodies having undevelopable walls, which comprises placing connecting pieces on a mold having the desired shape, applying a plurality of panels on said mold over said connecting pieces, temporarily assembling the whole, providing registering holes throughout said registering panels and connecting pieces, temporarily fixing struts on said panels so that they project outwardly therefrom, placing a second mold made of a plurality of sections over said temporarily assembled panels between said struts, applying a plurality of panels on said second named mold, providing registering holes throughout the last named panels and said struts, separating the panels, the struts and the connecting pieces from the mold and permanently assembling said connecting pieces, said panels and said struts through fixation means extending through the registering holes previously made so as to form a double walled hollow body.

12. A method of manufacturing elongated hollow bodies having a longitudinal plane of symmetry, and especially bodies having undevelopable metallic walls which comprises, applying a plurality of panels on a mold of the desired shape, temporarily assembling said panels along lines that coincide only in a discontinuous manner with sections at right angles to said plane of symmetry, providing registering holes throughout said panels, separating said panels from said molds, and permanently assembling said panels through fixation means extending through said holes.

13. A method of manufacturing elongated hollow bodies having a longitudinal plane of symmetry, and especially bodies having undevelopable metallic walls, which comprises, placing connecting pieces on a mold of the desired shape, applying a plurality of panels on said mold over said connecting pieces, temporarily assembling the whole, providing registering holes throughout said panels and said connecting pieces along lines that coincide only in a discontinuous manner with sections at right angles with said plane of symmetry, separating said panels and said connecting pieces from said mold and permanently assembling said panels and said connecting pieces together through fixation means extending through said holes.

14. A method of manufacturing elongated hollow bodies having a longitudinal plane of symmetry, and especially bodies having undevelopable metallic walls, which comprises, applying a plurality of panels on a mold of the desired shape, temporarily assembling said panels, providing registering holes throughout said panels along lines that coincide only in a discontinuous manner with longitudinal lines of the surface of said body, separating said panels from said molds, and permanently assembling said panels together through fixation means extending through said holes.

15. A method of manufacturing elongated hollow bodies having a longitudinal plane of symmetry, and especially bodies having undevelopable metallic walls, which comprises, placing connecting pieces on a mold of the desired shape, applying a plurality of panels on said mold over said connecting pieces, temporarily assembling the whole, providing registering holes throughout said panels and said connecting pieces along lines that coincide only in a discontinuous manner with longitudinal lines of the surface of said body, separating said panels and said connecting pieces from said mold and permanently assembling said panels and said connecting pieces together through fixation means extending throughout said registering holes.

In testimony whereof I have signed this specification.

LOUIS BÉCHEREAU.